No. 878,825. PATENTED FEB. 11, 1908.
J. G. RANDAXHE.
VALVE.
APPLICATION FILED JAN. 2, 1906.
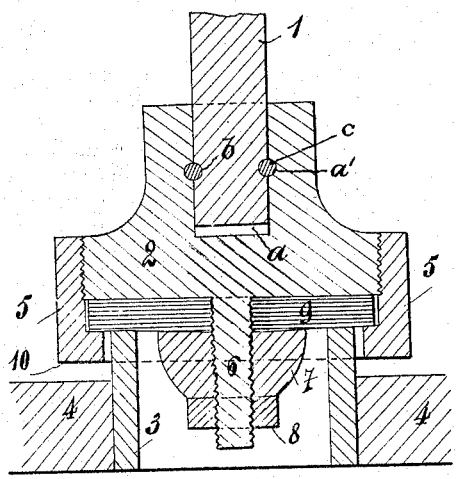

UNITED STATES PATENT OFFICE.

JEAN GUILLAUME RANDAXHE, OF LIEGE, BELGIUM.

VALVE.

No. 878,825.

Specification of Letters Patent.

Patented Feb. 11, 1908.

Application filed January 2, 1906. Serial No. 294,332.

*To all whom it may concern:*

Be it known that I, JEAN GUILLAUME RANDAXHE, a subject of the Kingdom of Belgium, residing in Liege, Kingdom of Belgium, 53 Quai de Longdoz, have invented certain new and useful Improvements in and Relating to Valves; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The object of the present invention is to provide a valve closure which will be tight at high and low pressure for all fluids, such as for example, steam whether superheated or not, water or air, etc.

The invention consists in providing a plurality of thin superposed sheet metal disks forming an elastic metallic surface. These disks are held together at the center by means of a screw and nut and at the circumference by means of a shouldered socket which latter may be adjusted to provide for a larger or smaller number of disks. The closure is kept air tight by pressing the metallic elastic cushion on the flat edge of a valve seat.

The annexed drawing shows a vertical sectional view of a valve seat, and a valve constructed according to my invention.

Referring to the drawing, 1 designates a well known form of valve-stem connected to a head 2 in such manner that the former may be rotated without imparting its movement to the latter. The example shown for connecting to two parts consists in providing a cylindrical bore $a$ in the head to receive the end of the stem 1. In the wall of the bore and in the periphery of the stem are formed annular grooves $a'$ and $b$ respectively, which coöperate and form a race-way for balls $c$. These balls may be inserted after the stem is in place in any suitable way as for instance through a bore (not shown) in the head communicating with the groove $a'$.

Protruding from the head in line with the axis of the stem is a screw 6 on which is mounted a plurality of thin superposed metal disks 9. These disks are of smaller diameter than the head and are held in place against the end of the head by a nut 7 which latter is locked by a jam-nut 8.

After the disks have been locked onto the head in the manner described they are further secured by a socket 5 which is screwed onto the periphery of the head said socket having an internal flange adapted to take over and engage the rim of the outer disk.

On closing the valve, the washers bear on the seat 3 fixed to the body 4 of the valve casing or the like and effect the required closure.

The nature of the metal of which the disks are made depends on the use to which the valve is intended to be put.

As above stated and as clearly shown in the drawing the diameter of the disks is less than the diameter of the head 2 so that when the socket 5 is screwed on the head there is an annular space formed between the inner periphery of the socket and the peripheries of the disks. This space permits a free expansion of the disks to take place when these become overheated as will be the case when superheated steam is being used. If no space is provided, and an expansion of the disks takes place, a buckling of the disks will necessarily result and a proper closure of the valve can not be had.

I claim:—

In a valve, the combination with a seat, of a valve head, a flanged socket adjustably mounted thereon, and a plurality of thin flat metal disks supported by the flange of the socket and of smaller diameter than the valve head thereby affording an annular space between their periphery and the inner periphery of the socket to allow free expansion of the disks under all conditions of working, and means to centrally secure the disks to the valve head.

In testimony that I claim the foregoing as my invention, I have signed my name in presence of two subscribing witnesses.

JEAN GUILLAUME RANDAXHE.

Witnesses:
 GEORGES VANDER HAEJHEN,
 LEONARD LEVER.